United States Patent Office 2,793,123
Patented May 21, 1957

2,793,123

COMPOSITION FOR PREVENTING THE ADHESION OF BAKED GOODS TO BAKING CONTAINERS

Charles J. Haas, Philadelphia, Pa.

No Drawing. Application February 18, 1954,
Serial No. 411,270

1 Claim. (Cl. 99—118)

This invention relates to a composition of matter and a method for coating bread, biscuit, roll, bun, and cake doughs prior to the ultimate step of baking with a mobile and a powdered mixture of edible components for the purpose of preventing an adhesion of the baked goods to their containers.

One object of this invention is to provide a method and a composition of matter that incorporates oleaginous substances wih other edible adjuvants whereby the quality and the quantity of the "latent" oleaginous components which are subsequently released can be controlled and minimized for the purpose of assisting in the prevention of adhesion between the baked goods and their respective containers.

Another object of this invention is to provide for the baker a pre-baking and potentially lubricous composition of matter that is dry, comminuted, and free-flowing; that remains constant and uniform in composition under ordinary conditions of temperature and humidity; and that undergoes physical and chemical changes only during the baking process.

A third object of this invention is to eliminate the "greasing" step in mass baking by applying directly a powdered and a potentially oleaginous preparation to the dough or by incorporating the preparation of this invention with the flour that is customarily applied to the dough during one of the conventional "flouring" steps that routinely precede the baking stage. Thus, this invention accelerates the process of mass baking, eliminates the necessity of costly greasing machinery, and thus contributes to a reduction in the cost of production.

A fourth object of this invention is to minimize the fumes and the odors that develop from the partial combustion of the unevenly applied grease in the conventional baking process by eventually bringing only a thin film of oil or grease to the surface of the metal pan or the container of any suitable material in which the dough is baked.

A fifth object of this invention is to provide a composition of matter which during the process of baking undergoes physical and chemical changes with the formation of a precrusted or insulating medium between the glutenous surface of the dough and its container and thereby aids materially as a preventive of the sticking of the baked product to its pan.

A further object of this invention is to improve the quality of the crust of the baked goods by intermingling with the crusted surface that ordinarily forms during the baking period the converted components of the pre-baking mixture that holds the oleaginous components in a state of quasi-suspension prior to the application of the oven heat.

A seventh object of this invention is to provide a means whereby the esthetically desirable glaze on buns, biscuits, cakes, and certain kinds of rye bread can be enhanced. A larger concentration of inverting agents such as citric acid, tartartic acid, etc. and their salts and analogues in the oleaginous preparation of this invention is conducive to achieving an improved glossy surface on the resulting crust.

Other and less generalized objects of this invention will become apparent to those skilled in the art of baking from a consideration and an evaluation of the following detailed description.

It has long been known that the gliadin and the glutenin released in the moist flour of the dough mixture interact to form a tenacious and sticky substance commonly called gluten. To prevent an annoying adhesion of this glutenous component of the dough to the container during the baking operation it has long been an established practice to apply manually or otherwise an oil or a grease to the container before placing into it the doughy mass to be baked. Under these conditions the baked loaf or cake can be readily removed from its container. Such an application of grease for the purpose of eliminating this factor of "stickiness" between the pan and the baked article has been variously effected by brushing, spraying, or swabbing a liquid or a semi-liquid oil or grease on the inner surface of the container.

It is known that mixtures of powdered fats with and without the addition of flour or starch have been applied to the dough directly or to the metal containers. However, such methods are inadequate and unsatisfactory owing to the circumstance that powdered fats do not adhere uniformly to the baking pans and their excess must be removed prior to baking. Furthermore, mixtures of powdered fat with flour or starch are unable to form the pre-crust or the insulating layer which is one of the pertient aspect of this invention. Nevertheless, a non-uniform distribution of grease is one of the invariable results of a conventional mode of application which entails a number of subsidiary and vexatious difficulties— such as a waste of the lubricating material, an undesirable spattering of the oil or grease, an excessive fuming of the products of decomposition of the grease, and an evolving of unpleasantly odoriferous byproducts. Furthermore, the direct application of grease to the lumps of dough prior to their baking—although it does facilitate their subsequent removal from the pans after baking— gives rise to further undesirable developments. The irregularity shaped lumps of dough when smeared or swabbed with grease become slippery and difficult of handling. The grease frequently concentrates in the crevices and the grooves of the mass of dough and becomes the source of the unwanted burned areas and lines that detract esthetically from the potential loaf or cake. Although a greasing of either the pan or the dough, preliminarily to the operation of baking, abates somewhat the problem of removing the baked goods from their containers, yet both methods of applying the grease are inadequate and unsatisfactory because of the secondary problems they create.

In this invention the dough of the bread or the cake is coated with a latent, oleaginous preparation during one of the "flouring" operations prior to the step of baking. As will be apparent when the mechanism of the interaction is posited, the oleaginous particles do not assert their lubricating properties at once, but only after a pre-crust has been formed as an intermediate layer between the superincumbent dough and the underlying container, at which time the oleaginous globules move directionally to the bottom and the sides of the metal or other suitable container. With the modern prevalence of large scale baking in which automatic machinery plays an important role, the "flouring" steps in which the lump of dough is shaped, formed, and reshaped may be one or several depending on the whim or mehanical finesse that motivates the supervising operator.

With the instrumentalities of this invention, the "flouring" step may consist of the application only of the latent oleaginous composition without the use of any adventitious and diluent flour. The following example is descriptive of a "flouring" step in which flour is mixed with a given though variable quantity of the oleaginous composition.

In one of these preliminary "flouring" operations the lubricating preparation of this invention is commingled with the flour in the proportions of one part of the lubricant to one part of flour. These proportions are not fixed, but may be altered within substantial limits depending on whether 200 or 1,000 pieces of dough are to be treated. The lubricating composition of this invention consists of an intimate mixture of selected components from the following three groups of edible substances:

1. Lubricant (15% to 85%)
2. Dispersing and coating agents (85% to 15%)
3. Inverter (¼% to 5%)

Experimentation has disclosed that many substances are well adapted to the function of lubricating the metal or other suitable pans used in the operation of baking. Among them are the edible animal fats—stearin, palmitin, and olein; the edible oils—olive oil, cotton seed oil, peanut oil, soya bean oil, and corn oil; the hydrogenated oils and fats; the edible waxes—carnauba, beeswax, castor oil wax, and spermaceti; the higher alcohols—miricyl alcohol, ceryl alcohol, and cetyl alcohol; the sterols; the phospholipins; the saturated and unsaturated fatty acids of high molecular weight; the mono- and di-glyceride esters of the edible higher fatty acids; and the several sorbitol esters.

In group 2, investigation has revealed that the following substances serve excellently as dispersing or coating agents—flour, starch, sugar, milk solids, bread crumbs, and plant proteins like soya bean flour. Predominantly, the lubricating composition of this invention consists of varying proportions of one or several constituents from group 1 intermixed with several constituents from group 2. To this well comminuted mixture of selected components from groups 1 and 2 approximately ¼ to 5% of an "inverter" is added and thoroughly mixed therewith. The inverter of choice is anhydrous citric acid; although hydrated citric acid, the citrates, tartaric acid, the non-toxic tartrates, lactic acid, the lactates, malic acid, and the malates have been found similarly effective for a conversion type of reaction. It has been determined that higher concentrations of the inverter—particularly up to 5% of citric acid—has been effective in imparting to rolls, buns, biscuits, and certain types of rye bread the glossy sheen or glaze that is favorably regarded by the individuals experienced in the baking art.

Although the precise physical and chemical changes which the several components of the lubricating composition undergo are not fully known, yet the following mechanism is somewhat speculatively, yet reasonably, presumed to be the basis of the operating conditions.

During one of the "flouring" steps, or in an operation in lieu of a "flouring" step, the lubricating preparation becomes attached as a superficial coating to the glutenous surface of the mass of dough. This external layer consists substantially of a suspensoid of hydrophobic fat globules in a continuous phase of flour and dough. The fat droplets are apparently kept disparate and disseminated by protective walls or septa of starch, sugar, plant proteins, and citric acid. A preferred embodiment emerging from extensive experimental data comprises a lubricating mixture of 75% fat, 25% dispersing agent, and ¼% anhydrous citric acid. As the temperature rises during the baking operation, the theory is postulated that the starch in the septa surrounding the fat globules is dextrinized, the sugar is decomposed and partly caramelized, the plant proteins are transposed, and water vapor and other gases are evolved. These degradation products from the plant proteins, the sugar, the starch, and the citric acid—constituting the residue or debris from the partial pyrolysis of the oleaginous mixture—form a layer or a pre-crust that insulates the glutenous dough from the surface of the pan and, thereby, eliminates much of the obnoxious "sticking" between the baked goods and the container. In addition to its functional purpose, the pre-crust also contributes desirably to an improved flakiness and flavor in the crust of the loaf, bun or cake.

During the baking stage, as the temperature increases, the hydrophobic fat globules break through their containing septa, coalesce, and—being polar to the container—flow directionally to the sides and the bottom of the metal container. The oil or the grease thus released from the oleaginous composition deposits as a thin film on the inner surface of the pan. This deposition of a requisite quantity of grease, exuding from the external surface of the potential loaf, is an essential factor for effectuating a ready removal of the baked article from the pan. Furthermore an excessive smoking of acrolein and other pyrolytic products, resulting from a thermal breakdown of an uneven and concentrated distribution of grease by a conventional method, can be largely avoided.

With the many edible substances to be selected from the three groups that comprise the oleaginous mixture of this invention, the variations in the latter are flexible and allow of its adaptation to all types of dough in different kinds of baking equipment. Frequently, the manipulable variants in composition can serve not only the technical requirements of specific doughs, but can also be responsive to the esthetic whims and the less scientific desiderata of the baking supervisor. The oleaginous mixture of this invention—by virtue of its unique properties, fluidity, stability, and portability—eliminates one step in the complicated routine of mass baking, either by incorporating it with the diluent flour in one of the "flouring" steps or by applying it directly in lieu of a "flouring" step. Thus, the intricate machinery often used to grease the dough prior to baking can be dispensed with. The present invention is not restricted to the details of the several examples described since the latter are to be construed as illustrative and not limitative. The modifications that may be effected without departing from the spirit and the scope of this invention are defined in the annexed claim.

I claim:

A composition for preventing the adhesion of baked goods to baking containers comprising 15 to 85 parts of oleaginous substances selected from the group consisting of edible oils and fats; substantially 85 to 15 parts of dispersing agents selected from the group consisting of carbohydrates and starches; and ¼ to 2 parts of inverting agents selected from the group of non-toxic polycarboxylic acids and their respective salts to provide a mobile powder of quasi-suspended oleaginous particles adapted to be applied directly to the glutenous surface of dough and to impart a glaze to the resulting crust.

References Cited in the file of this patent

UNITED STATES PATENTS

| | | |
|---|---|---|
| 1,328,556 | Bloch | Jan. 20, 1920 |
| 1,483,704 | Wilcox | Feb. 12, 1924 |

OTHER REFERENCES

"The Technology of Bread-Making," by Jago et al., Bakers' Helper Company, American edition, 321 South La Salle Street, Chicago, Ill., pp. 121 and 325.